United States Patent Office 3,356,401
Patented Dec. 5, 1967

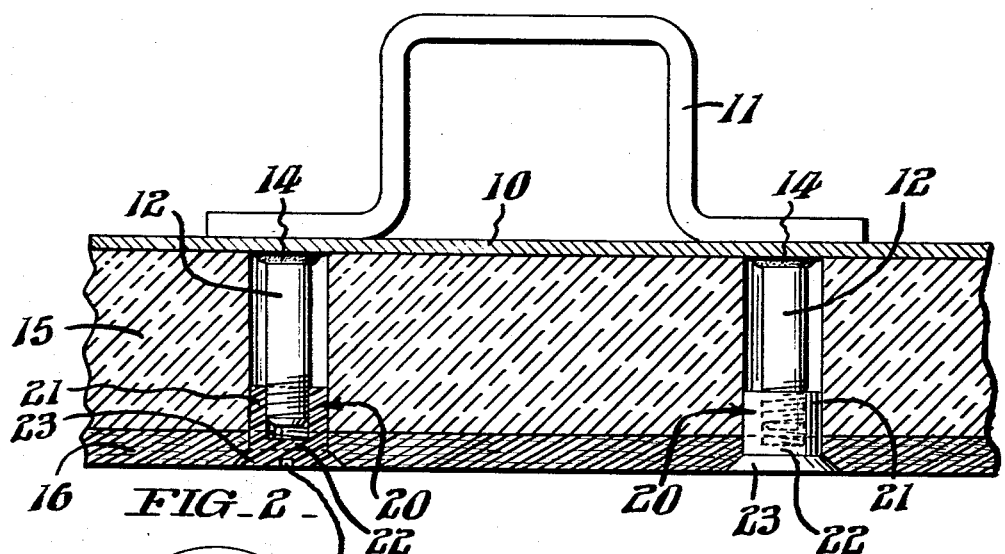
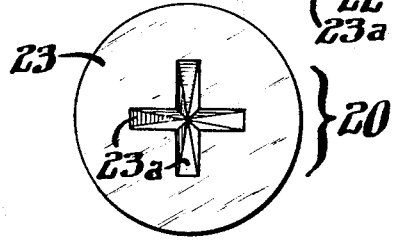
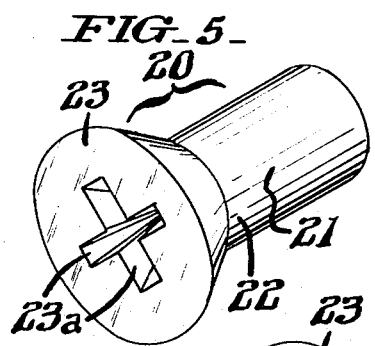
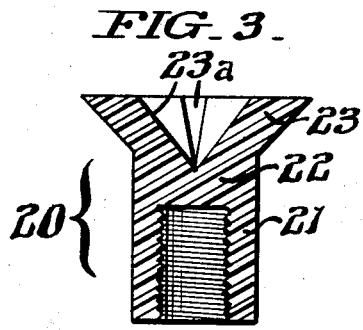
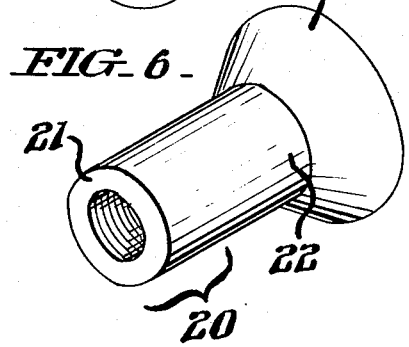
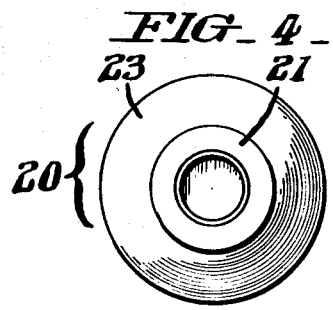
INVENTOR.
*Leroy W. Bertram,*
BY
*Paul & Paul*
ATTORNEYS.

3,356,401
SELF-LOCKING HEAT-INSULATING
FEMALE SCREW
Leroy W. Bertram, Norristown, Pa. (26 W. 165 Tomahawk
Drive, Wheaton, Ill. 60187)
Filed Sept. 24, 1964, Ser. No. 399,033
2 Claims. (Cl. 287—189.36)

This invention relates to a fastener, and particularly to a special type of female screw adapted to function as a self-locking heat-insulating fastener.

The invention was conceived and developed in connection with the design of special plywood-faced polyurethane panels for insulating railroad box cars, and it will be convenient to illustrate and describe the invention as used for this purpose. However, it is to be understood that the fastener of the present invention may be advantageously employed in other environments and instances where an insulating self-locking fastener is required.

The principal object of the invention is to provide a self-locking fastener of the nut type which will withstand vibration without becoming loosened, which is adapted for securing insulating panels, and which will break the heat conducting path between the threaded metal stud or bolt on which it is screwed and the insulating panel which is being fastened.

In the drawing:

FIG. 1 is a view, principally in section, illustrating a typical use for the fastener of the present invention;

FIG. 2 is a top plan view of the head of the fastener;

FIG. 3 is an elevational view, in section, of the fastener;

FIG. 4 is a bottom plan view of the fastener; and

FIGS. 5 and 6 are perspective views of the fastener.

Referring now to FIG. 1, the reference numeral 10 identifies a metal plate, as for example, the steel sheathing of a railroad box car which is to be heat insulated. A metal side stake 11 is also shown but has no bearing on the invention. Threaded steel studs 12 are welded at spaced intervals to the interior surface of the steel sheathing 10, as by welds 14.

The reference numeral 15 indicates heat insulating material which may be 2" rigid polyurethane foam. Reference numeral 16 indicates the plywood facing.

The function of the fasteners of the present invention, in combination with the threaded steel studs 12, is to secure the plywood facing 16 and polyurethane foam 15 to the interior of the steel sheathing 10.

Reference numeral 20 identifies the fastener which, as clearly illustrated in FIGS. 3, 5 and 6 has a hollow cylindrical shank portion 21, a solid cylindrical neck portion 22, and a cone head 23. The hollow shank portion 21 is internally threaded, the diameter of the threaded bore and the pitch and type of the threads conforming to the threaded ends of the steel studs 12 on which the fastener 20 is to be screwed.

The head 23 is a flat-top cone for entry into the countersunk holes provided in the plywood facing 16, thereby to lie flush with the surface of the facing, as illustrated in FIG. 1. The top of head 23 is cross-slotted as at 23a for receiving a hand operated or machine operated fastening tool. The side walls of the cross slots 23a are inclined and converge to substantially a common point.

The female screw fastener 20, illustrated in the drawing and just described, is made of hard but resiliently deformable plastic, such as nylon, preferably nylon known as Dupont Zytel 101 since this material, in addtition to being hard and resiliently deformable, has great tensile strength and excellent thermal insulating properties.

When the female screws 20 are screwed on to the threaded ends of the steel studs 12, as illustrated in FIG. 1, the fasteners serve to securely fasten the plywood-faced polyurethane foam insulation to the interior of the steel sheathing 10 of the box car.

As the screw 20 is tightened on the stud 12, the hard plastic material will be deformed sufficiently to cause the screw 20 to lock into place and to resist loosening on the stud under the vibration condition encountered in the operation of the car.

In addition, the annular wall of the hollow shank portion 21 and the solid neck portion 22 of the fasteners 20 completely cap the steel studs 12, and, since the plastic material of the fastener is selected to have high heat insulating value, the heat conducting path from the inside of the car through the steel studs 12 into the steel exterior sheathing 10 of the box car is broken. The breaking of this conductive path is of importance in providing an insulated box car having good heat insulation properties.

In a preferred form, the female screw above described has the following dimensions: total length, 1¼"; large diameter of cone head, 1¼"; outside diameter of shank and neck 21/32"; axial length of threaded bore, ⅝"; diameter of bore, ⅜"; length of solid neck, 0.197"; depth of cross slots, 0.428"; angle of cone head, 82° from axis.

I have described my invention in a preferred form, but intend to be limited only by the scope of the appended claims.

Having described my invention, I claim:

1. In combination; a steel sheathing; heat-insulation panels; and heat-insulation self-locking fastening means for securing said heat-insulation panels to said sheathing, said fastening means comprising: a plurality of stationary steel studs threaded-externally at their outer ends and having their inner ends secured to said steel sheathing at spaced locations, said studs extending into holes provided therefor in said heat-insulation panels, and solid enlarged headed hollow-shank internally-threaded female screws of resilient deformable plastic material of good heat-insulation properties threaded on to said steel studs for securing said insulation panels, the internal diameter of the hollow shank of said screws and the pitch and type of the internal threads of said screws conforming to the threaded ends of said steel studs, at least said shank portion of said fastener screws and the internal threads thereof deforming sufficiently by axial extension during rotational tightening on the stationary threaded stud to resist loosening under vibration.

2. The combination claimed in claim 1 characterized in that the solid enlarged heads of said screws are flat-topped, slotted and cone-shaped, and in that said holes in said insulation panels are countersunk for receiving the heads of said screws.

References Cited
UNITED STATES PATENTS

| | | | |
|---|---|---|---|
| 3,119,430 | 1/1964 | Rico | 85—35 X |
| 2,134,705 | 11/1938 | Crecca | 189—36 |
| 2,681,469 | 6/1954 | Condon | 85—32 X |
| 3,019,864 | 2/1962 | Lester | 52—617 X |

(Other references on following page)

| | | UNITED STATES PATENTS | |
|---|---|---|---|
| 3,077,058 | 2/1963 | Hansel | 52—378 |
| 3,091,946 | 6/1963 | Kesling | 312—214 X |
| 3,177,754 | 4/1965 | Santer | 85—32 |
| 3,181,311 | 5/1965 | Latzer | 312—214 X |

FOREIGN PATENTS

| 762,000 | 1/1934 | France. |
|---|---|---|
| 7,781 | 3/1912 | Great Britain. |

OTHER REFERENCES

Railway Age, Dec. 9, 1944, p. 25.

DAVID J. WILLIAMOWSKY, *Primary Examiner.*

HARRISON R. MOSELEY, *Examiner.*

J. KARL BELL, L. J. SANTISI, *Assistant Examiners.*